(12) United States Patent
Staats

(10) Patent No.: US 9,825,894 B2
(45) Date of Patent: *Nov. 21, 2017

(54) DISPLAYING COMPLEX MESSAGING THREADS INTO A SINGLE DISPLAY

(71) Applicant: AOL Inc., Dulles, VA (US)

(72) Inventor: Eric Staats, Sunnyvale, CA (US)

(73) Assignee: Oath Inc., Dulles, VA (US)

( * ) Notice: Subject to any disclaimer, the term of this patent is extended or adjusted under 35 U.S.C. 154(b) by 222 days.

This patent is subject to a terminal disclaimer.

(21) Appl. No.: 14/557,054

(22) Filed: Dec. 1, 2014

(65) Prior Publication Data

US 2015/0089400 A1 Mar. 26, 2015

Related U.S. Application Data

(63) Continuation of application No. 13/493,281, filed on Jun. 11, 2012, now Pat. No. 8,903,928, which is a continuation of application No. 11/462,701, filed on Aug. 5, 2006, now Pat. No. 8,200,762.

(60) Provisional application No. 60/803,698, filed on Jun. 1, 2006.

(51) Int. Cl.
| | |
|---|---|
| *G06F 15/16* | (2006.01) |
| *G06F 3/00* | (2006.01) |
| *G06F 3/048* | (2013.01) |
| *H04L 12/58* | (2006.01) |
| *G06Q 10/10* | (2012.01) |
| *G06F 3/0481* | (2013.01) |

(52) U.S. Cl.
CPC ............ *H04L 51/16* (2013.01); *G06F 3/0481* (2013.01); *G06Q 10/107* (2013.01)

(58) Field of Classification Search
CPC ......... H04L 51/14; H04L 51/16; H04L 51/22; H04L 51/26; H04L 51/36
USPC ......... 709/204–207, 217–219, 231; 715/700, 715/713, 752, 758, 763
See application file for complete search history.

(56) References Cited

U.S. PATENT DOCUMENTS

| | | | |
|---|---|---|---|
| 6,704,772 B1 * | 3/2004 | Ahmed | G06Q 10/107 |
| | | | 709/206 |
| 7,178,099 B2 | 2/2007 | Meyer et al. | |
| 7,222,299 B1 | 5/2007 | Lim et al. | |
| (Continued) | | | |

OTHER PUBLICATIONS

"What is Gmail?", 2007 Google, available at http://mail.google.com/mail/help/intl/en/about.html (PDF enclosed entitled "Document 1," 4 pgs.).

(Continued)

*Primary Examiner* — Farzana Huq

(74) *Attorney, Agent, or Firm* — Finnegan, Henderson, Farabow, Garrett & Dunner LLP

(57) ABSTRACT

A method for organizing a message thread containing one or more messages. A root message and reply groupings are identified, each reply grouping depending from the root message. Each reply grouping has one or more child reply messages depending from a common parent message. The child reply messages within each reply grouping are ordered in chronological order based on the time of each of the one or more child reply messages was received or sent. The reply groupings are hierarchically ordering based on a relationship between the reply grouping and its parent message. A single display allows a user to view the message thread and the content of all of the messages in accordance with the hierarchical ordering.

19 Claims, 5 Drawing Sheets

(56) References Cited

U.S. PATENT DOCUMENTS

| | | | |
|---|---|---|---|
| 2002/0073157 | A1 | 6/2002 | Newman et al. |
| 2004/0049543 | A1* | 3/2004 | Kaminsky ............. H04L 12/581 709/204 |
| 2004/0119740 | A1 | 6/2004 | Chang et al. |
| 2004/0260772 | A1 | 12/2004 | Mullen et al. |
| 2005/0004990 | A1 | 1/2005 | Durazo et al. |
| 2005/0223063 | A1 | 10/2005 | Chang et al. |
| 2005/0262206 | A1 | 11/2005 | Weir et al. |
| 2006/0161849 | A1* | 7/2006 | Miller .................... G06F 9/4443 715/744 |
| 2006/0168025 | A1* | 7/2006 | Jain ..................... H04L 12/5835 709/206 |
| 2007/0061738 | A1 | 3/2007 | Taboada et al. |
| 2007/0106729 | A1 | 5/2007 | Adams et al. |
| 2007/0143428 | A1 | 6/2007 | Kumar et al. |

OTHER PUBLICATIONS

International Search Report and Written Opinion from corresponding PCT application No. PCT/US2007/070266, dated Mar. 21, 2008, 9 pgs.

* cited by examiner

FIGURE 2C

- 220B
- 222 → To: John Doe | Sent: Tue 3/7/2006 3:37 PM
- Cc: Joe Jones
- Subject: RE: Questionnaire
- 224
- 226 → ――― Original Message ―――
- Please fill out the following questionnaire:

Question 1: What color are your eyes?
      My eyes are brown

Question 2: What month were you born in?
      I was born in June

Question 3: How tall are you?
      5'10"

FIGURE 2D

- 250
- 252 → Subject: Questionnaire
- 266 → ⊟ John Doe wrote on 3/7/2006, 3:37 PM: ― 200

Please fill out the following questionnaire: ― 256

Question 1: What color are your eyes?
      ⊟ Joe Jones wrote on 3/8/2006, 10:55 AM: ― 259a
      My eyes are brown. ― 260a    ◄― 258a Question 2: What month were you born in?
      ⊟ Joe Jones wrote on 3/8/2006, 10:55 AM: ― 259b
      I was born in June. ― 260b    ◄― 258b Question 3: How tall are you?
- 268 → ⊞ Joe Jones wrote on 3/8/2006, 10:55 AM: ― 259c
                                                   ◄― 258c
      ⊟ Jane Jones wrote on 3/07/2006, 5:52 PM: ― 262
          My eyes are green. I was born in August. I am 5'9" tall. ― 264

DISPLAYING COMPLEX MESSAGING THREADS INTO A SINGLE DISPLAY

CROSS-REFERENCE TO RELATED APPLICATIONS

This application is a continuation of U.S. patent application Ser. No. 13/493,281, filed on Jun. 11, 2012 (now allowed), which is a continuation of U.S. patent application Ser. No. 11/462,701, filed on Aug. 5, 2006 (now U.S. Pat. No. 8,200,762), which claims the benefit of priority of U.S. Provisional Patent Application No. 60/803,698, filed Jun. 1, 2006 The disclosures of the above-referenced applications are expressly incorporated herein by reference to their entireties.

BACKGROUND

1. The Field of the Invention

The present invention relates generally to electronic messaging systems. More specifically, the present invention relates to methods and systems for organizing a message thread.

2. The Relevant Technology

Modern computer systems allow for the interchange of data and resources through network environments. Electronic messaging systems, such as email and instant messaging, are widely used by individuals and businesses for providing a rapid, low cost means of communication. Certain electronic messaging systems provide a documented record of all communications sent to and from a particular user. One common example is email, which will be used for purposes of describing the present invention. However, it will be appreciated that the features of the present invention extend to other forms of messaging that may also provide a documented record of communications, such as, but not limited to, instant messaging.

Email threads often become long and unwieldy as each successive drafter responds to earlier email messages in an email thread. This is particularly true where messages are being sent to multiple recipients, and each recipient has the ability to respond to one or more of the other recipients. The email threads may become particularly complex when response emails include duplicate content of earlier emails in the email thread, or when the response drafter includes inline comments within the content of an earlier email. The end result is that readers typically re-read much, if not all, of the email thread to fully understand the context of each email.

Various techniques have been employed for organizing and displaying email messages and email threads. For example, one common method of organizing and displaying email to a reader is to display a list of all messages in an inbox to the reader in chronological or reverse chronological order. The reader can view the content of each message by selecting the message. Upon selecting the message, the content of the message is displayed to the reader. Typically, if the selected message is a response to one or more previous messages, a duplicate of the content of all previous messages is also included underneath the content of the selected message. As described above, where a particular message thread is later in a long line of responses, the duplication of the content of the previous messages can become quite lengthy and cumbersome.

This shortcoming is compounded by the fact that respondents have the ability to branch off a main message thread and conduct a side message thread between two or all of the participants in a message thread. Again, both the main message thread and the side message thread will suffer from the problem of including duplicate content from the messages lying in the message thread.

Furthermore, most current methods typically list each email message within a user's inbox in chronological order, regardless of whether the messages are related to a common subject or thread. This method of combining all emails into one chronological listing is often confusing to a user when the user would like to follow a particular thread of related emails. Even where an email service divides the emails into separate threads according to subject matter, many email services simply display each individual email in chronological order, without regard to the actual flow of the conversation. As mentioned above, side message threads can branch off a main message thread, but may not be apparent to a reader due to the chronological listing of e-mail messages is often confusing to a reader.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of organizing a message thread containing one or more messages. The method may be practiced, for example, in a messaging system such as an email system. The method includes identifying a root message and one or more reply groupings that depend from the root message. Each reply grouping includes one or more child reply messages depending from a parent message. The method further includes ordering each of the child reply messages in each reply grouping in chronological order based on the time each of the child reply messages was sent. The reply groupings are hierarchically ordered based on a relationship between each of the parent messages. The resultant message thread is displayed in a single display, giving the reader the option of viewing the content of all of the one or more messages in accordance with the hierarchical ordering A further embodiment is directed to a method of displaying an email message thread to reduce redundant display of email messages. The method may be practiced, for example in an email system. The method includes identifying a parent message and a child reply message made in response to the parent message. The child response message includes a quoted version of the parent message and an inline response included in the quoted version of the parent message. The method further includes providing a single display of the message thread including a single appearance of the parent message. The content of the inline response is placed directly into a corresponding location of the parent message.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 2B and 2C illustrate examples of child reply email messages that are created in response to the parent message illustrated in FIG. 2A.

FIG. 2D illustrates a graphical user interface displaying the example message thread incorporating the parent message of FIG. 1A and the child reply email messages of FIGS. 2B and 2C organized in accordance with one embodiment of the present invention.

DETAILED DESCRIPTION

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention Embodiments of the present invention provide for methods, systems and graphical user interface data structures for organizing and displaying a thread of electronic messages in a manner that allows a user to read the message thread in a logical, succinct manner. As used herein, the term "message thread" refers to a group of electronic messages that are related to each other through a tag or other indicator that electronic messaging clients use to recognize electronic messages as being related. Typically, message threads occur in the context of an electronic "conversation" in which one or more users reply to an originating or root message one or more times. The term "message thread" also contemplates that two or more participants in a conversation may branch off of a main message thread to create one or more side message threads. The messages in a message thread may include a variety of content. As used herein, the term "content" refers to any information included in the message body of an electronic message which can include, but is not limited to, text, graphics, images, sound, multimedia content, and the like.

The organizational techniques employed herein relate to displaying a message thread which reduces or eliminates the duplication of content within the thread and allows a user to read through the message thread according to the conversational flow of the thread, as opposed to a chronological ordering of the messages.

Figure 1A:
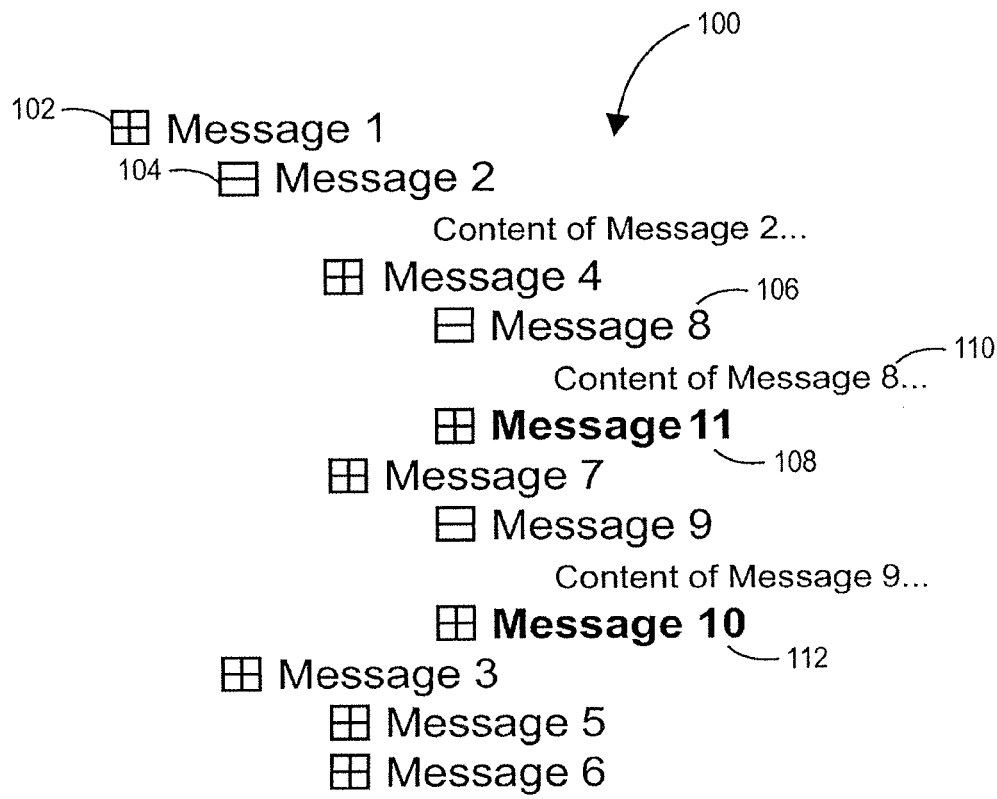
FIG. 1A illustrates a graphical user interface displaying a message thread organized in accordance with one embodiment of the present invention.

Referring now to FIG. 1A, a more detailed example is illustrated using a diagrammed reference to a message thread 100 organized and displayed in accordance with one embodiment of the present invention. The message thread 100 includes a series of messages on a given subject, including the root Message 1 and the subsequent reply messages, Messages 2 through 11. Messages 1 through 11 were sent by one or more senders to one or more recipients in chronological order (i.e., Message 1, followed by Message 2, followed by Message 3, etc.), although, as can be seen from FIG. 1A, this is not how they are displayed on the graphical user interface.

Message 1 is the root message of the message thread 100, meaning that it is the original message that initiated the thread. Messages 2 and 3 were made in direct response to Message 1. Messages 4 and 7 were made in direct response to Message 2. Messages 8 and 11 were made in direct response to Message 4. Messages 9 and 10 were made in direct response to Message 7. Messages 5 and 6 were made in direct response to Message 3.

As described in the background, many conventional email services would simply display the message thread 100 in either chronological or reverse-chronological order, thus depriving the reader of a visual display of the flow of the conversation. Furthermore, many conventional email services require the reader to open each email individually to see the content of the email, and the reader is often required to reread the content of a single message. The user would be required to piece together the flow of the conversation, which, in the example of FIG. 1A, could be a daunting task.

Instead of simply displaying the messages in chronological order, the present invention organizes and displays the message thread in accordance with the flow of the conversation. For example, as illustrated in FIG. 1A, each reply message in the message thread 100 is organized in relation to the message to which the reply was made, and in some cases, the one or more messages that were made in response to the reply message. Therefore, a reader of the message thread 100 has a much better idea of the actual flow of the conversation, i.e., who has responded and how the messages actually relate to one another.

For instance, suppose that when the reader logs in to view his messages, he has received Messages 4 through 8 since his last login. Had the messages of the message thread 100 been displayed in chronological order, the reader would likely read Messages 4, 5, 6, and 7 in chronological order before finally reaching Message 8. Although Messages 5, 6, and 7 may be tangentially related to Message 4, Message 8 was in direct response to Message 4, and therefore is likely more directly related to Message 4 then Messages 5, 6, and 7. However, by the time the reader finally reaches Message 8, the reader will likely be required to reread Message 4 in order to understand the context of Message 8. Conversely, by organizing the messages of the message thread 100 according to the flow of the conversation, the reader visually understands that Message 8 is in direct response to Message 4, and therefore understands the context in which Message 8 was written. The reader can easily read Message 4 followed by Message 8 without being distracted by Messages 5, 6, and 7.

Figure 1B:
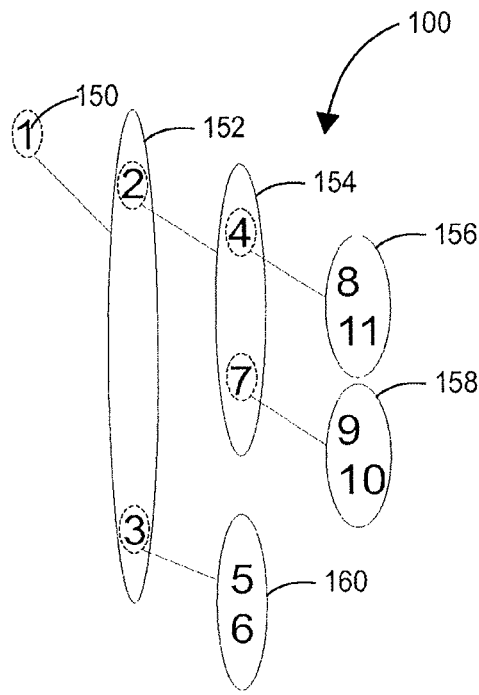
FIG. 1B illustrates the use of reply groupings, in accordance with one embodiment of the present invention.

Referring now to FIG. 1B, a more detailed depiction is provided of one manner in which the message thread 100 may be organized. The messages of the message thread 100 are divided into one or more reply groupings, which include groupings 152, 154, 156, 158, and 160. Each reply grouping ultimately depends from the root message 150, and includes one or more child reply messages depending from a parent message. In the example of FIG. 1B, each reply grouping 152-160 is illustrated by a solid ellipse, and each parent message is illustrated by a dotted ellipse. The lines connecting each parent message to a reply grouping illustrate the relationship between the parent messages and the reply groupings, i.e., all of the child reply messages within a single reply grouping were made in response to the parent message to which the reply grouping is connected.

A message may be both a parent message and a child reply message. For example, Message 2 is a child reply message because it was created in response to Message 1. Message 2 is also a parent message because Messages 4 and 7 were made in response to Message 2. Similarly, Messages 3, 4, and 7 are all both child reply messages and parent messages.

Each of the child reply messages within a single reply grouping is ordered in chronological order, based on either the time at which the child reply messages were sent by the sender or were received by the recipient. Therefore, when viewing the message thread 100 a reader can read all of the messages that were made in response to a particular parent message in the order in which the messages were either sent or received.

As described above, each of the reply groupings 152, 154, 156, 158, 160 is hierarchically organized based on the relationship between the reply grouping and its parent message. Therefore, when the message thread 100 is displayed, each reply grouping is positioned in a manner that portrays the relationship between itself and its parent message. For example, in the embodiment of FIG. 1B, the child reply messages of each reply grouping are placed below their corresponding parent message in chronological order. This can visually be depicted, as shown in FIG. 1A by indenting the child reply messages in a reply grouping in relation to their parent message.

Although the example of FIG. 1A illustrates one technique of hierarchically displaying the message thread 100, other techniques may also be employed for illustrating to a reader the hierarchical relationships between the messages within the message thread 100. For example, the message thread 100 may include a color coding scheme, graphical icons, or other visual technique for illustrating the relationship between the messages in the message thread 100. Visual techniques may include connecting parent messages to their child reply messages with lines, drawing boxes around each message wherein the boxes drawn around parent messages also are drawn around their child reply messages, and the like.

After the message thread 100 is organized, a single display of the message thread 100 is provided which provides the reader with the ability to view the content of all of the messages in the thread 100. By providing the content of the messages in a single display, the reader is not required to select multiple messages in order to read an entire message thread. Instead, the reader can select a single message thread to view, upon which the entire content of the message thread is displayed to the reader in a single display. In contrast, as described in the background section, many conventional email services require the reader to individually select each message of a message thread, which requires the reader to view the content of each message in the message thread separately. Furthermore, some email services do not group messages from a single message thread together at all. Instead, these email services typically list each email in chronological order, regardless of whether the messages are related to each other.

In addition to providing the entire message thread 100 within a single display, the content of each message in the message thread may be expanded and collapsed to allow the user to selectively view the content of each message. By allowing a reader to selectively view each message within the single display, the reader can easily minimize the amount of material that is being displayed, thereby simplifying the single display of the message thread 100 described above.

For example, as illustrated in FIG. 1A, icons 102 and 104 may be employed to allow the user to expand or collapse the content of the individual messages. In one embodiment, illustrated in FIG. 1A, when a message is in a collapsed form, only a message header, e.g., 106, is displayed to the user. The message header may include the name of the sender of the message, the time and date at which the message was sent or received, and other information that may be used to identify the message. When the message is expanded, the content, e.g., 110, of the message is displayed underneath the message header.

Although FIG. 1A illustrates one technique that may be employed for collapsing and expanding the content of each message within the message thread 100, other methods for collapsing and expanding the content of each message may be employed. For example in one embodiment, a reader can expand and collapse the content of each message simply by selecting the header of each message, as opposed to an icon 102 or 104. In another embodiment, the message headers are displayed separately from the content of the message. For example, the message headers may be displayed along the left side of a display screen. Each of the message headers may be selected individually by the reader. The reader expands a message by selecting the message header, upon which the content of the message is displayed in the main portion of the display screen. Upon selecting multiple message headers, the contents of each message appear in the main portion of the display screen in accordance with the hierarchical organization described above.

In one embodiment, the message thread 100 further provides an indicator of whether the one of the messages has previously been accessed or read by the reader. For example, in the embodiment illustrated in FIG. 1A, the message headers of the messages that have not been read by the user are printed in bold face font in order to indicate that the user has not previously accessed them. In the specific example illustrated in FIG. 1A, Messages 10 and 11 (reference numerals 108 and 112), which are the two most recent messages received, are printed in boldface font to indicate to the reader that the messages have not yet been read. Additional indicators may also be employed to indicate the presence of a new message. For example, unread messages may be displayed in a unique color, font, font size, with a graphical icon, and the like, in order to depict to the reader that the new messages have not previously been accessed. Depicting the presence of a new message in conjunction with the present invention can enhance a user experience because the newest message may not always appear at the top or the bottom of the message thread, as is illustrated by Message 11 (108) of FIG. 1A.

In one embodiment, where a child reply message may include duplicate content of a parent message, the message thread 100 includes the functionality of blocking or collapsing the duplicate content in the child reply message. Typically, when a response message is made to a parent message, the response message includes not only the content of the response, but also repeats or duplicates the content of the parent message that is being responded to. The duplicate content of the parent message is usually included above or below the area reserved for the content of the response, and may include a notification such as "Original Message" to indicate that the parent message is being duplicated. As a result, when a message thread includes a long string of child reply messages, the latter messages often include duplicate content from prior emails in the message thread. Therefore, in a traditional email service that requires the reader to open each email individually by clicking on each separate message, the reader often must sort through an unwieldy amount of information in order to determine what content has or has not previously been read. The redundant duplication of parent messages is often tedious and, at times, can be confusing to the reader. To address this problem, the present embodiment may either collapse the duplicate content of parent messages within child reply messages in order to eliminate the redundant display of the content of the parent messages.

Alternatively, the duplicate content of the parent message may be blocked from being displayed in the child reply message. Note that in some embodiments, it may not be desirable to delete the duplicate parent content altogether from the child reply message since the user may try to access electronic messages via a different source and that source may not have the message thread displaying functionality of the present invention. In those cases, it would be desirable for the user to have the same functionality that is conventionally available in current electronic messaging systems. Displaying the duplicate content of the parent message as collapsed or blocked will not be detrimental to the reader because the child reply message will be displayed in the same display as the parent message.

Another situation in which duplicate content becomes an issue is where instead of placing response content in the reply area of the response message, the user places reply content inline with the duplicate content of the parent message, referred to herein as an inline response. In this situation, the present invention places the content of the inline response directly into the corresponding location of the original content of the parent message. This allows a user to quickly view both the parent message and the inline response without being required to view the parent message multiple times.

FIGS. 2A through 2D illustrates both of these methods for reducing the redundant display of content in a message thread. In particular, the embodiment illustrated in FIGS. 2A through 2D reduces the redundant display of duplicate content of a parent message as well as integrates inline responses included in child reply messages directly into the parent message to which the child message depends. A single display of the resultant message thread is provided which allows the reader to read the entire thread without viewing the redundant display of the parent message.

Figure 2A:
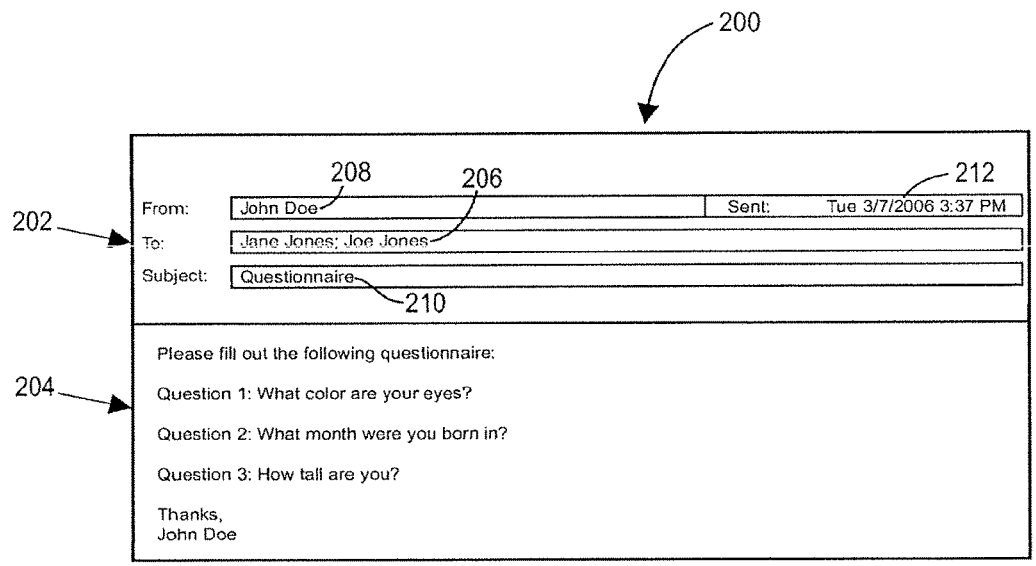
FIG. 2A illustrates an example parent email message that may be included in a message thread.

FIG. 2A provides a sample parent email message 200 sent to multiple recipients 206 requesting that each recipient respond to a questionnaire within the content 204 of the email message 200. Although individual email services may vary, the display of FIG. 2A is one example of how the parent email message 200 may be displayed to one of the recipients 206. The parent email message 200 may include header information 202, including the sender of the message 208, the recipients 206, a subject line 210, and the date and time 212 at which the parent message was either sent or received. The parent email message 200 also includes parent message content 204, which, in this example, includes a series of questions for each of the recipients 206. The present embodiment is applicable to any email message, regardless of the form or substance of the content 204.

Figure 2B:
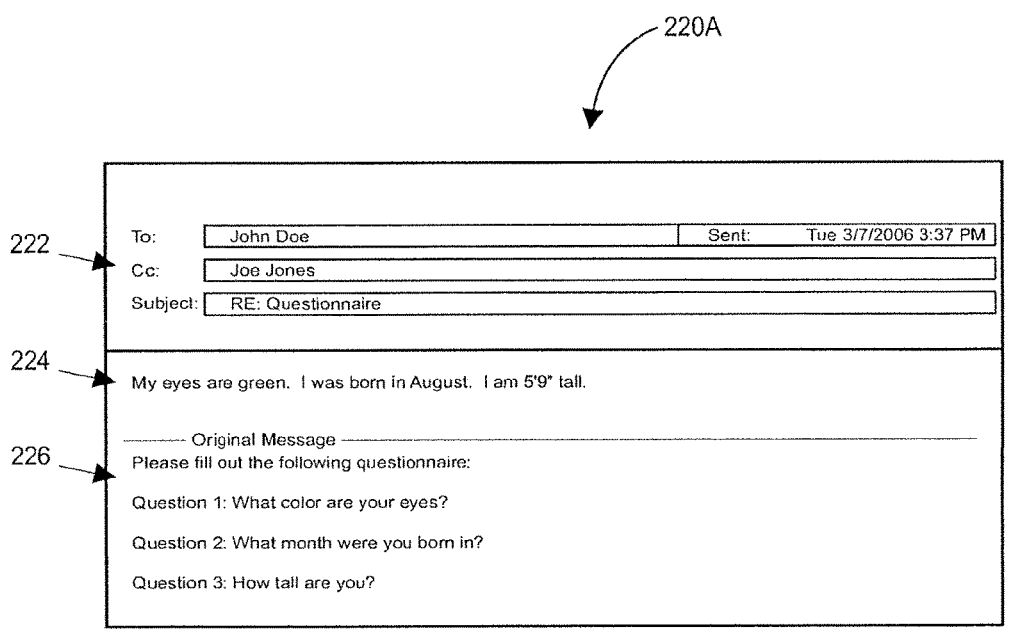

Upon receiving the parent message 200 and selecting to reply to the parent message 200, FIG. 2B illustrates a reply window 220A displayed to the recipient 206 for allowing the recipient to type the content of a reply message. The format of the reply window 220A may vary depending on the email service employed by the recipient 206. The reply window 220A may include header information 222, a response content area 224 wherein the recipient 206 may type a response message, and a duplicate content area 226 of the parent message so that the respondent can view the content to which the respondent is making a reply. The recipients 206 responding to the questionnaire may do so in a number of ways, and the manner in which the present invention displays the response may vary depending on the manner in which the recipient responds.

For example, as shown in FIG. 2B, assume that the first recipient, Jane Jones, responds using a reply message 220A by typing her response into the response content area 224 provided for the recipient's response. For example, the content of her response may be "My eyes are green. I was born in August. I am 5'9" tall." In this case, a duplicate of the parent content is included in area 226. When Jane hits "send," the reply message will include both the response content 224 and duplicate parent content 226. However, as shown in FIG. 2D, in the single display 250 to the recipient of Jane Jones' message, the content from the response content area 224 of the reply message 220A will appear outside of the original parent content and, optionally, indented from the parent message header 251 while the duplicate content of the parent message is blocked from being displayed.

In contrast, as shown in FIG. 2C, Joe Jones replies using a reply message 220B using inline response. That is, instead of typing his response into the response content area 224 allotted for the response, Joe Jones includes inline responses directly in the duplicate content area 226 of the parent message. When the recipient receives John's reply, the single display 240 illustrated in FIG. 2D will show Joe Jones' inline responses 258a, 258b, and 258c included directly in the corresponding locations of the content of the original parent message. Although the inline responses 258a, 258b and 258c were generated by a single child reply message, the present embodiment recognizes that the child reply message includes multiple inline responses, and will include each of the inline responses directly into the corresponding locations of the original parent message 200. In the present example, the inline responses 258 may be formatted to include headers 259a, 259b and 259c for providing information identifying the content 260a and 260b of the inline responses. The headers may include information to clarify to the reader that inline response is not part of the parent message, but is instead a comment made in response to the parent message.

Instead of displaying the duplicate content of the parent message along with the inline response(s) as is typical with many conventional email services, the present embodiment minimizes the amount of redundant material that is displayed to the reader by either blocking duplicate content of parent messages included in a response or displaying the inline responses 258a, 258b and 258c themselves directly into the original parent message 200. In both cases, the reader is not required to reread multiple instances of the parent message 200 in order to identify the new content. The present embodiment of reducing content redundancies saves screen space and reduces the hassle of understanding the context of a message thread.

FIG. 2D also illustrates other techniques for organizing a message thread. For instance, similar to the example of FIG. 1A, the embodiment illustrated in FIG. 2D includes the ability for a reader to expand and collapse the parent message 200, the inline response messages 258a, 258b, and 258c, and the other child reply messages 262. In the example of FIG. 2D, the parent message 200, the first and second inline responses 258a and 258b, and the child reply message 262 from Jane Jones are all in their expanded form. Conversely, the third inline response 258c is shown collapsed so that the message content is hidden from view. The ability to collapse and expand each message provides the reader with the ability to customize the view of the single display 250. Other techniques may also be employed for expanding and collapsing each message or inline response, as is described in reference to FIG. 1A.

In another embodiment, an indicator is provided of whether the messages or inline responses have previously been accessed or read by the reader. For example, in the embodiment illustrated in FIG. 1A, the message headers of the messages that have not been read by the user are printed in bold face font in order to indicate that the user has not previously accessed them. For instance, the third inline response 258c from Joe Jones is printed in bold to indicate that the content of the inline response has not been accessed and/or read by the reader. As described in reference to FIG. 1A, other techniques may also be employed for indicating if a message or inline response has been accessed and/or read by the reader.

Although the embodiments illustrated in FIGS. 1A and 2D are described separately, the principles from both embodiments can be combined. For example, the child reply messages that do not include inline responses can be organized in accordance with the hierarchical organization illustrated in FIG. 1A. When the email service detects the presence of a child reply message having an inline response, the e-mail service may include the inline responses directly into the appropriate parent message, in accordance with the embodiment illustrated in FIG. 2D.

Messaging applications that generate, send and/or receive electronic messages are well known in the art. Thus, a detailed description of the components of a messaging application will not be included here, except to note that the features of the present invention can be easily integrated into an existing electronic messaging applications and systems. For example, systems for performing the above electronic message organization techniques may include an email service installed locally on a client computer or a webmail email service located on a server accessible via a web browser.

Figure 3:
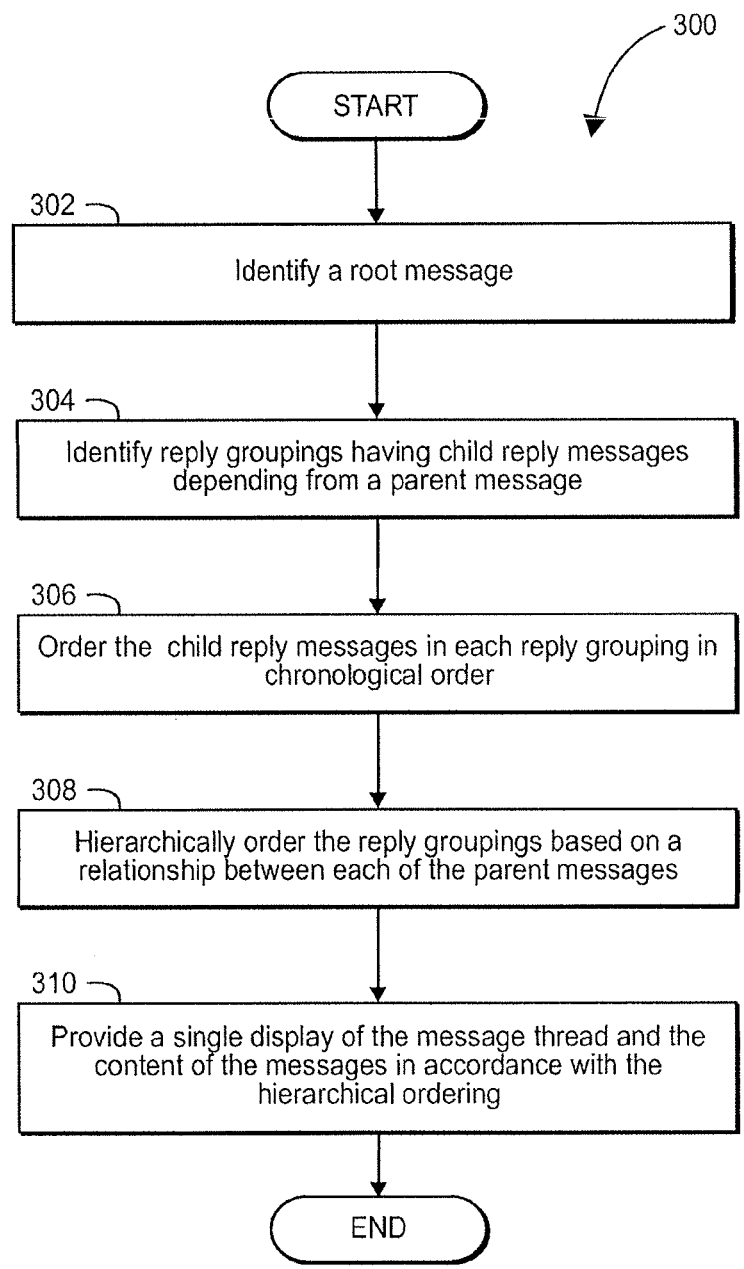
FIG. 3 is a flow chart diagram of a method for organizing a message thread containing one or more messages in accordance with one embodiment of the present invention.

Referring now to FIG. 3, a method 300 for organizing a message thread containing one or more messages is illustrated. The method 300 may be practiced, for example, in a computer messaging system such as an email messaging system. The method 300 includes, at 302, identifying a root message. Referring once again to FIGS. 1A and 1B, an illustrative example of a messaging thread 100 is illustrated, including a root message 150 (Message 1).

At 304, the method 300 also includes identifying one or more reply groupings that depend from the root message, each reply grouping having one or more child reply messages depending from a parent message. Thus, as illustrated in the FIG. 1B example, the message thread 100 may include reply groupings such as 152, 154, 156, 158 and 160, designated by the solid ellipses. All of the child reply messages within a single reply grouping depend from a common parent message, wherein the parent messages are designated by dotted ellipses. As illustrated in FIG. 1B, all of the reply groupings 152, 154, 156, 158 and 160 ultimately depend from the root message 150. By way of example, the reply grouping 154 includes child reply messages 'Message 4' and 'Message 7', which depend from the common parent message 'Message 2'.

At 306, the method 300 further includes ordering each of the one or more child reply messages in each reply grouping in chronological order based on the time each of the child reply messages was either sent from a sender or received by the recipient. For example, each of the messages included in the FIG. 1B example could be received in the same order that they are numbered. Therefore, within a single reply grouping 152, 154, 156, 158 and 160, the child reply messages are listed in chronological order.

At 308, the method 300 further includes hierarchically ordering each of the one or more reply groupings based on a relationship between the reply grouping and the parent message from which the reply grouping depends. Referring again to FIG. 1B, each of the reply groupings 152, 154, 156, 158 and 160 are hierarchically organized in accordance with the manner in which each of the parent messages are related to one another and to the root message 150.

The method 300 also includes, at 310, providing a single display that allows a user to view the message thread and the content of all of the one or more messages in accordance with the hierarchical ordering. As described above, the display of each message within the message thread may either collapse or block any duplicate content from the parent messages so that the reader is not presented with the redundant content. In one embodiment, the display also provides the user with the ability to collapse and expand at least one of the root message, the parent message, or the child reply message. In addition, the single display also incorporates any inline responses that may have been included in a child reply message directly into its parent message. Further, the content of the inline responses may also be collapsed and expanded by the reader. The method may further include blocking the child reply message having the inline response from being displayed so that the child reply message is not redundantly displayed. Furthermore, the method 400 may include indicating whether the parent message and/or inline response has been accessed or read by the user.

Figure 4:
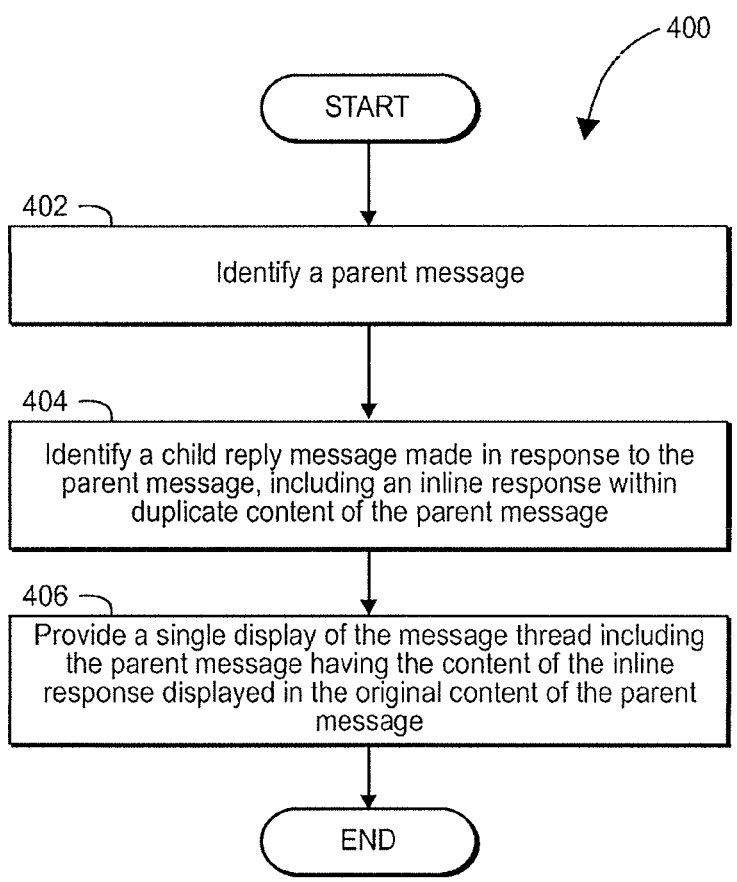
FIG. 4 is a flow chart diagram of a method for displaying an email message thread to reduce redundant display of email messages in accordance with one embodiment of the present invention.

Referring now to FIG. 4, a method 400 is illustrated of displaying a message thread to reduce redundant display of content. The method 400 may be practiced, for example, in an email system. The method 400 includes, at 402, identifying a parent message and, at 404, identifying a child reply message made in response to the parent message. Referring again to FIGS. 2A through 2D, the message thread may include one or more parent messages 200 and one or more child reply messages 258 and 262. One or more of the child reply messages identified at 404 may include duplicate content of the parent message included with a response in the response content area (FIG. 2B) and/or an inline response included in the duplicate content area of the parent message (FIG. 2C).

At 406, the method 400 further includes providing a single display of the message thread including a single instance of the content of the parent message. For responses that were provided in the reply content area, the response is included outside of the content of the parent message. Whereas, the content of inline responses are placed directly into a corresponding location of the content of the parent message. Method 400 may also include ordering the inline responses of the multiple child reply messages in chronological order and placing the content of the ordered inline responses directly into the corresponding location of the parent message. The method 400 may further include providing a user with the ability to collapse and expand the content of the parent message, child reply message, and/or inline response message. Furthermore, the method 400 may include indicating whether the parent message and/or inline response has been accessed or read by the user.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for organizing an electronic message thread, the method comprising the following operations performed by one or more processors:
    identifying a parent message from a first user, the parent message comprising a first portion and a second portion;
    identifying a first child reply message from a second user, the first child reply message including a duplicate portion of at least a part of the parent message, a first inline response located within the duplicate portion of the at least a part of the parent message and responsive to the first portion of the parent message, and a second inline response located within the duplicate portion of the at least a part of the parent message and responsive to the second portion of the parent message;
    generating electronic instructions to display, on a graphical user interface, the message thread including the parent message, at least a portion of content of the first inline response of the first child reply message being displayed between the first portion and the second portion of the parent message with a first header providing information identifying the second user and displayed between the first portion and the second portion, and at least a portion of content of the second inline response of the first child reply message being displayed after the second portion of the parent message with a second header providing information identifying the second user and displayed after the second portion; and
    further generating instructions to display, on the graphical user interface and as part of the message thread, a first reply grouping sent to the first user, the first reply grouping being hierarchically ordered based on a relationship between the parent message and the first reply grouping.

2. The method of claim 1, further comprising generating a single display that allows a user to collapse and expand the duplicate portion of at least a part of the parent message included as part of first child reply message.

3. The method of claim 1, further comprising generating electronic instructions to display a response from a response content area of the first child reply message outside the duplicate portion of at least a part of the parent message.

4. The method of claim 1, further comprising generating electronic instructions to display the first and second inline responses as collapsed content.

5. The method of claim 1, further comprising blocking the first and second inline responses from being displayed outside of the duplicate portion of at least a part of the parent message.

6. The method of claim 1, further comprising generating electronic instructions display an indication of whether at least one of the parent message, or the first child reply message have been accessed by the first user, the second user, or a third user.

7. The method of claim 1, wherein at least one of the parent message or the first child reply messages is an email message.

8. The method of claim 1, further comprising:
    identifying a second child reply message, wherein each of the first and second child reply messages include the duplicate portion of at least part of the parent message and inline responses located within the duplicate portion of at least part of the parent message; and
    generating electronic instructions to display at least a portion of content of the inline responses of the first and second child reply messages located within the duplicate portion of at least part of the parent message.

9. The method of claim 8, further comprising ordering the inline responses of the first and second child reply messages in chronological order.

10. A non-transitory computer-readable storage medium storing instructions, which when executed by one or more processors, cause the one or more processors to:

identify a parent message from a first user, the parent message comprising a first portion and a second portion;

identify a first child reply message from a second user, the first child reply message including a duplicate portion of at least a part of the parent message, a first inline response located within the duplicate portion of the at least a part of the parent message and responsive to the first portion of the parent message, and a second inline response located within the duplicate portion of the at least part of the parent message and responsive to the second portion of the parent message;

generate electronic instructions to display, on the graphical user interface, the message thread including the parent message, at least a portion of content of the first inline response of the first child reply message being displayed between the first portion and the second portion of the parent message with a first header providing information identifying the second user and displayed between the first portion and the second portion, and at least a portion of content of the second inline response of the first child reply message being displayed after the second portion of the parent message with a second header providing information identifying the second user and displayed after the second portion; and further generate instructions to display, on the graphical user interface and as part of the message thread, a first reply grouping sent to the first user, the first reply grouping being hierarchically ordered based on a relationship between the parent message and the first reply grouping.

11. The non-transitory computer-readable storage medium of claim 10, wherein the instructions further cause the one or more processors to generate a single display that allows a user to collapse and expand the duplicate portion of at least a part of the parent message included as part of first child reply message.

12. The non-transitory computer-readable storage medium of claim 10, wherein the instructions further cause the one or more processors to generate electronic instructions to display a response from a response content area of the first child reply message outside the duplicate portion of at least a part of the parent message.

13. The non-transitory computer-readable storage medium of claim 10, wherein the instructions further cause the one or more processors to generate electronic instructions to display the first and second inline responses as collapsed content.

14. The non-transitory computer-readable storage medium of claim 10, wherein the instructions further cause the one or more processors to block the first and second inline responses from being displayed outside of the duplicate portion of at least a part of the parent message.

15. The non-transitory computer-readable storage medium of claim 10, wherein the instructions further cause the one or more processors to generate electronic instructions display an indication of whether at least one of the parent message, or the first child reply message have been accessed by the first user, the second user, or a third user.

16. The non-transitory computer-readable storage medium of claim 10, wherein at least one of the parent message or the first child reply messages is an email message.

17. The non-transitory computer-readable storage medium of claim 10, wherein the instructions further cause the one or more processors to:

identify a second child reply message, wherein each of the first and second child reply messages include the duplicate portion of at least part of the parent message and inline responses located within the duplicate portion of at least part of the parent message; and generate electronic instructions to display at least a portion of content of the inline responses of the first and second child reply messages located within the duplicate portion of at least part of the parent message.

18. The non-transitory computer-readable storage medium of claim 17, wherein the instructions further cause the one or more processors to order the inline responses of the first and second child reply messages in chronological order.

19. A system for organizing a message thread, comprising:

one or more processors; and a memory storing instructions, the instructions being executable by the one or more processors to perform operations comprising:

identifying a parent message from a first user, the parent message comprising a first portion and a second portion;

identifying a first child reply message from a second user, the first child reply message including a duplicate portion of at least a part of the parent message, a first inline response located within the duplicate portion of the at least a part of the parent message and responsive to the first portion of the parent message, and a second inline response located within the duplicate portion of the at least a part of the parent message and responsive to the second portion of the parent message;

generating electronic instructions to display, on the graphical user interface, the message thread including the parent message, at least a portion of content of the first inline response of the first child reply message being displayed between the first portion and the second portion of the parent message with a first header providing information identifying the second user and displayed between the first portion and the second portion, and at least a portion of content of the second inline response of the first child reply message being displayed after the second portion of the parent message with a second header providing information identifying the second user and displayed after the second portion; and further generating instructions to display, on the graphical user interface and as part of the message thread, a first reply grouping sent to the first user, the first reply grouping being hierarchically ordered based on a relationship between the parent message and the first reply grouping.

* * * * *